Feb. 19, 1929.
T. ADAMS
1,702,239
TANDEM DISK HARROW
Filed Aug. 15, 1927
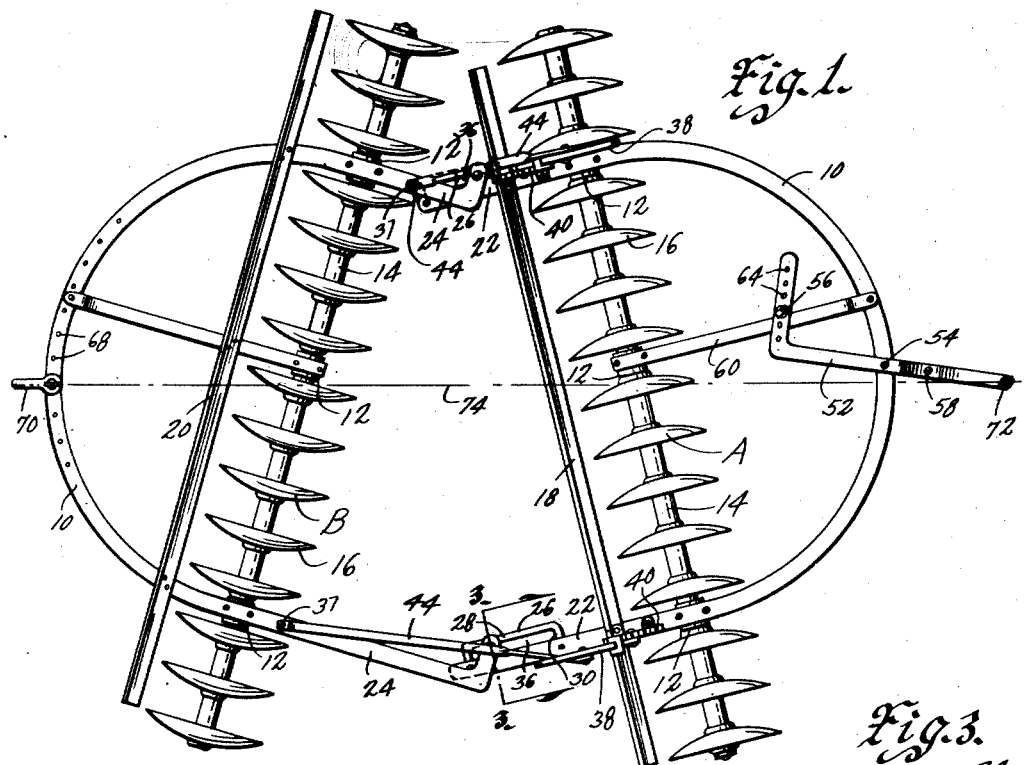
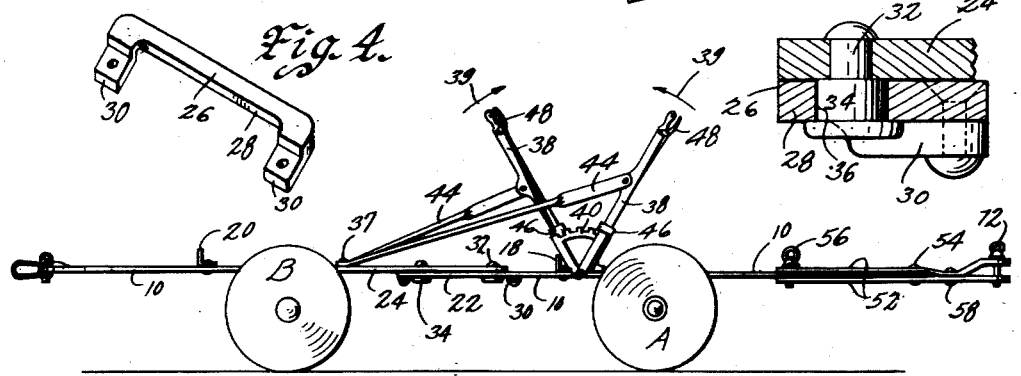
Inventor
Theron Adams
by Bair & Freeman Attorneys
Witness Patented Feb. 19, 1929.

1,702,239

UNITED STATES PATENT OFFICE.

THERON ADAMS, OF AMES, IOWA.

TANDEM DISK HARROW.

Application filed August 15, 1927. Serial No. 213,021.

The object of my invention is to provide a tandem disk harrow of simple, durable, and comparatively inexpensive construction.

A further object of my invention is to provide a tandem disk harrow in which a pair of disk harrow members are connected together, the disks of one harrow member being cupped in the opposite direction from those of the other one whereby the soil being harrowed is thrown first in one direction and then the other and the formation of ridges in the field or unharrowed portions is eliminated.

A further object is to provide a pair of disk harrow frames having the discs journaled thereon and to provide a sliding connection between these frames whereby they may be positioned at any desired angle with relation to each other.

Still another object is to provide a draw bar pivoted to one of said frames so that when the frames are positioned at an angle the draw bar can be moved to a position in line with the center of the two harrow members so that side draft will not be encountered in operation.

With these and other objects in view, my invention consists in the construction, arrangement and combination of the various parts of my device, whereby the objects contemplated are attained, as hereinafter more fully set forth, pointed out in my claims and illustrated in the accompanying drawing, in which:

Figure 1 is a plan view of my improved tandem disk harrow illustrating the two harrow members positioned at an angle with respect to each other.

Figure 2 is a side elevation of the same showing the two harrow members positioned parallel to each other.

Figure 3 is a semi-diagrammatic plan view illustrating the harrow members parallel to each other.

Figure 4 is a perspective view of a portion of the device; and

Figure 5 is an enlarged sectional detail view taken on the line 5—5 of Figure 1.

On the accompanying drawing I have used the reference character A to indicate generally a front disk harrow member and B a rear disk harrow member. The members A and B each comprise a U frame member 10 having bearing brackets 12 secured to their under-surfaces. Shafts 14 are journaled in the brackets 12 on each of the harrow members A and B and a series of disks 16 are secured on the shafts 14 in any suitable manner.

It will be noted that the disks 16 on the harrow member B are cupped in an opposite direction from those on A.

The U frames 10 are braced for cross frame members 18 and 20. For connecting the two U frames 10 of the harrow members A and B together I provide arms 22 and 24. The arms 22 extend toward the arms 24 and underlie them as clearly illustrated in Figure 1 of the drawings.

I provide a sliding connection between each arm 22 and its underlying arm 24. The sliding connection is provided by a yoke 26 secured to each arm 22. The yoke 26 has a portion 28 running parallel to the arm 22 and has a pair of bracket ends 30 adapted to be riveted or otherwise secured to the arm 22. A shouldered rivet 32 is riveted in the free end of each arm 24 and has an enlarged portion 34 adapted to loosely fit in the slot 36 formed by the portion 28 of the yoke 26 and one side of the arm 22. From the construction of the parts just described it will be obvious that the portion 34 of the rivet 32 is capable of sliding movement in the slot 36 whereby each arm 24 can be moved relative to its adjacent arm 22. For maintaining the sliding connections just described in any of their desired positions in the slots 36, I provide a pair of operating levers 38. The levers 38 are pivoted to notched quadrants 40 secured to the brace member 18. The levers 38 are connected to the arms 24 by links 44, each having one end pivoted to a lever 38 and the other end pivoted at 37 to the arms 24. A dog 46 is slidably mounted on each lever 38 and is controlled by a finger 48 pivoted to each lever 38 and connected to the dog 46 by a rod 50.

For pulling my tandem disk harrow I provide a draw bar 52 pivoted at 54 to the forward portion of the front frame member 10. The draw bar 54 comprises two bars secured together as at 58, one bar being above the frame

10 of the harrow A and the other one below. The draw bar 52 can be locked in any of its pivoted positions with relation to the frame member 10 by the following described device.

A brace bar 60 extends from the front of the front frame 10 to the brace 18. The brace bar 60 has a bearing 62 in which the shaft 14 of the harrow A is journalled. The two bars of the draw bar 54 extend across the top and bottom of the brace bar 60. A removable pin 56 is positioned in one of a series of holes 64 in the draw bar 54. By this construction, the tractor pulling the harrow will always keep the pin 56 against one side of the brace bar 60. The frame member 10 of the disk harrow member B is provided with a series of openings 68 in any one of which a clevis 70 can be secured. Various implements such as tooth harrows, cultipackers, rollers or even another tandem disk harrow of the character described can be secured to the clevis 70 and drawn behind my tandem harrow.

*Practical operation.*

In the operation of my improved disk harrow, the levers 38 can be moved to the position illustrated in Figure 2 of the drawing in which position the harrow members A and B are parallel as clearly illustrated in Figure 3. The pin 56 can be removed so that the draw bar 52 will assume straight ahead position and the harrow device can be drawn from one field to another without cutting the ground.

When it is desired to use the device for harrowing plowed ground the levers 38 are moved in the direction of the arrows 39 upon which the disk harrow members A and B will assume the position illustrated in Figure 1. This is the cutting position of the disks 16 as they must be at an angle relative to the line of draft in order to properly disk the soil. The draw bar 52 is moved to position with the opening 72 thereof approximately on the indicated center line 74 so that the pull on the entire device will not cause a side draft. In this position the clevis 70 is also positioned on the center line 74 so that any device being pulled behind the disk harrow will not cause a side draft on it.

Substantial advantages arise from using the units A and B in tandem. For instance no open space is left as is the case when the units are placed end to end as the adjacent end disks cannot be positioned close enough together without interfering with each other when the units are end to end and adjusted to various angles. In consequence, no unharrowed strip of soil is left for the weeds to grow in when used tandem.

By causing the disks 16 of one unit to disk the ground and throw it in one direction and those in the other unit to throw it in an opposite direction, the tendency to form ridges at the overlapping points of one strip of harrowing with another is counteracted and a more efficient job of harrowing is accomplished.

Although I have illustrated one embodiment of my invention, it is to be understood that mechanical equivalents can be substituted for parts thereof and it is my intention to cover by my claims any such modifications which reasonably fall within their scope.

I claim as my invention:

1. A tandem disk harrow comprising a plurality of frames each having a series of disks journaled thereon, means for connecting said frames together, said means comprising arms mounted on said frames and extending toward each other, coacting sliding connections between the ends of the arms on one frame and the ends of the arms on its adjacent frame whereby the frames may be adjusted to positions at an angle or parallel relative to each other and means for extending some and contracting others of the coacting arms relative to each other, whereby such adjustment may be attained.

2. A tandem disk harrow comprising a plurality of frames each having a series of disks journaled thereon, the disks on each frame being cupped in opposite directions, a U-frame secured to each harrow frame, the ends of the U-frames extending toward each other, a slotted connection between the arms of one U-frame and the arms of the other one for allowing said ends to be moved with respect to each other whereby the harrow frames can be adjusted to positions parallel or at various angles relative to each other and means for locking said ends in any of their adjusted positions.

3. A tandem disk harrow comprising a plurality of frames each having a series of disks journaled thereon, the disks on each frame being cupped in opposite directions, a U-frame secured to each harrow frame, the ends of the U-frames extending toward each other, a slotted connection between the arms of one U-frame and the arms of the other one for allowing said ends to be moved with respect to each other whereby the harrow frames can be adjusted to positions parallel or at various angles relative to each other, means for locking said ends in any of their adjusted positions, a draw bar pivoted to one of said U-frames and means for fixing said draw bar with relation to said U-frame whereby the line of draft extends through the center point of said frames.

4. A tandem disk harrow comprising a plurality of frames each having a series of disks journaled thereon, the disks on each frame being cupped in opposite directions, a U-frame secured to each harrow frame, the ends of the U-frames extending toward each other, a slotted connection between the arms of one U-frame and the arms of the other one for allowing said ends to be moved with respect to each other whereby the harrow frames can be adjusted to positions parallel or at various angles relative to each other, means for locking said ends in any of their adjusted positions, a draw bar pivoted to one of said U-frames and means for fixing said draw bar with relation to said U-frame whereby the line of draft extends through the center point of said frames, said means comprising a draw bar pivoted to one of said frames and having a portion provided with perforations and a pin extending through one of said perforations and bearing against a portion of the harrow frame.

Des Moines, Iowa, April 29, 1927.

THERON ADAMS.